United States Patent [19]
Thorsrud

[11] Patent Number: 4,707,402
[45] Date of Patent: Nov. 17, 1987

[54] FORMATION OF LAMINATED STRUCTURES BY SELECTIVE DIELECTRIC HEATING OF BONDING FILM

[75] Inventor: Agmund K. Thorsrud, Bartlesville, Okla.

[73] Assignee: Phillips Petroleum Company, Bartlesville, Okla.

[21] Appl. No.: 786,909

[22] Filed: Oct. 11, 1985

[51] Int. Cl.[4] .................... B32B 15/00; B32B 31/00; B05D 3/02
[52] U.S. Cl. .................... 428/328; 428/331; 428/337; 428/340; 428/408; 428/419; 428/432; 428/450; 428/451; 428/448; 428/469; 427/140; 427/45.1; 156/272.2
[58] Field of Search .............. 428/331, 328, 337, 340, 428/408, 419, 432, 450, 451, 448, 469; 427/45.1, 140

[56] References Cited

U.S. PATENT DOCUMENTS

| | | | |
|---|---|---|---|
| 3,468,736 | 9/1969 | Porter | 156/273 |
| 3,865,662 | 2/1975 | Segal | 156/94 |
| 3,894,983 | 7/1978 | Higbee | 260/37 |
| 3,979,543 | 9/1976 | Higbee | 428/331 |
| 4,157,273 | 6/1979 | Brady | 156/315 |
| 4,212,922 | 7/1980 | Tieszen | 428/419 |
| 4,212,923 | 7/1980 | Brady | 428/419 |
| 4,352,707 | 10/1982 | Wenglar et al. | 156/359 |
| 4,522,875 | 6/1985 | Still, Jr. et al. | 428/419 X |

*Primary Examiner*—P. C. Ives
*Attorney, Agent, or Firm*—French and Doescher

[57] ABSTRACT

Multiple materials are bonded together by means of an RF-sensitized bonding film or sheet, wherein the RF-sensitized bonding film or sheet is inserted at an intermediate position adjacent to the multiple materials to be bonded, and exposed to a dielectric field for such period of time so as to effect fusion or sintering of the RF-sensitized bonding film or sheet to the multiple materials so as to bond the multiple materials together and form a laminated structure.

13 Claims, No Drawings

FORMATION OF LAMINATED STRUCTURES BY SELECTIVE DIELECTRIC HEATING OF BONDING FILM

The invention relates to a process for bonding multiple materials together to form a laminated structure. In one embodiment, the invention comprises heating under pressure at least one RF(radio frequency)-sensitized bonding film or sheet that is inserted at an intermediate position adjacent to the multiple materials to be bonded so as to form a laminated structure. In a second embodiment, a damaged laminated structure or, alternatively, a continuous fiber-reinforced composite structure is repaired by heating under pressure a RF-sensitized bonding film or sheet that is inserted at an intermediate position adjacent to the damaged laminated structure and a patch material placed in the damaged area so as to bond the multiple materials together and form a laminated structure.

In many instances, it would be most desirable for technical, economical or weight reasons to laminated polymer films or sheets or their composites with similar or dissimilar (in composition or structure) films or sheets without having to heat the whole assembly or certain structural parts of the assembly. Poor heat conductivity, heat deformation or degradation and heat loss make conventional heating systems impractical. The use of adhesive bonding is often complicated by vapor entrapment, special drying conditions, insufficient wetting and/or adhesion to one or more substrates, incompatibility in chemical resistance and mechanical strength at higher temperatures and aging. Further, problems with bonding are accentuated with higher melting engineering resins and difficult to bond polymers like polyolefins and fluorocarbons.

In order to overcome the aforementioned problems, the present invention utilizes a laminate and a process for preparing a laminate comprising a RF-sensitized bonding film or sheet. The bonding film or sheet is RF-sensitized by adding a dielectric heat sensitizer to the bonding film or sheet so as to impart to the bonding film or sheet a dielectric loss factor much higher than the materials to be bonded. The RF-sensitized bonding film or sheet is then inserted at an intermediate position adjacent to the materials to be bonded and under pressure exposed to a dielectric RF field. The RF-sensitized bonding film or sheet will selectively be heated to the desired melt temperature and will fuse or sinter with the adjoining materials to be bonded so as to form a laminated structure.

It would therefore be highly desirble to provide a process for bonding multiple materials together to form a laminated structure. It would also be desirable to provide a process for repairing a damaged laminated structure, or alternatively, a continuous fiber-reinforced composite structure or sheet by heating under pressure a RF-sensitized bonding film or sheet that is inserted at an intermediate position adjacent to the damaged laminated structure and a patch material placed in the damaged area so as to bond the material together and form a laminated structure.

It is therefore an object of the invention to provide a process for bonding multiple materials together to form a laminated structure. In one embodiment, it is an object of the invention to heat under pressure an RF-sensitized bonding film or sheet that is inserted at an intermediate position adjacent to the materials to be bonded so as to form a laminated structure.

In a second embodiment, it is a further object of the invention to repair a damaged laminated structure, or alternatively a continuous fiber-reinforced composite structure by heating under pressure an RF-sensitized bonding film or sheet that is inserted at an intermediate position adjacent to damaged laminated structure and a patch material placed in the damaged area so as to form a laminated structure.

These and other objects and advantages of the invention will be apparent from the following detailed description of the invention.

SUMMARY OF THE INVENTION

In accordance with the invention, a laminated structure and a process for bonding multiple materials together to form a laminated structure are provided in which a dielectric heat sensitizer is added to a bonding film or sheet (straight polymer or composite) so as to RF-sensitize the bonding film or sheet and provide it a dielectric loss factor much higher than the materials to be bonded.

The RF-sensitized bonding film or sheet having a high dielectric loss factor can be made by conventional methods from the same or different material as the materials to be bonded. The RF-sensitized bonding film or sheet is inserted at an intermediate position between the materials to be bonded and under pressure exposed to a dielectric field. The RF-sensitized bonding film or sheet having a high dielectric loss factor will selectively be heated to the desired melt temperature and will fuse or sinter with the adjoining materials to be bonded. The materials to be bonded which have a minimal dielectric loss factor compared to the RF-sensitized bonding film or sheet will not be significantly heated. The resulting bond between the materials to be bonded and the RF-sensitized bonding film or sheet will form a laminated structure.

DETAILED DESCRIPTION OF THE INVENTION

The invention is broadly applicable to the use of polymeric materials formed by any technique for use in the preparation of the RF-sensitized bonding film or sheet or the materials to be bonded. Such suitable polymeric materials include poly(arylene sulfides) formed by any technique. In general, such polymers include aromatic moieties having sulfide (—S—), ketone (CO) and/or sulfone ($SO_2$) linkages. Examples of such polymers include poly(phenylene sulfide) which can be prepared by the methods of U.S. Pat. No. 3,354,129 and U.S. Pat. No. 3,919,177 and poly(arylene sulfide/sulfone), which can be produced by reacting sodium sulfide and bis(p-chlorophenyl)sulfone. The poly(arylene sulfide) resins must be fusible and can be linear or cross-linked. The presently preferred polymers for use in the preparation of the RF-sensitized bonding film or sheet or the materials to be bonded are poly(phenylene sulfide), poly(biphenylene sulfide), poly(phenylene sulfide sulfone) and poly(phenylene sulfide ketone).

Suitable dielectric heat sensitizers for use in the invention include certain types of electrically conductive carbon black. Examples of such electrically conductive carbon black include Ketjenblack XC® and Black Pearls 2000®, a trademark of Cabot Corporation, and various metal oxides and mineral powders. The presently preferred sensitizer is about 2 percent to about 4 percent Frequon ® Z/B-10. The Frequon ® is composed of about 90 percent crystalline sodium aluminum silicate zeolites having a particle size of less than about one micron and a surface area in excess of about 400 m$^2$/g., and about 10 percent electrically conductive carbon black in amounts of about 1 to about 5 parts per 100 parts by weight poly(arylene sulfide). The use of the crystalline sodium aluminum silicate zeolites will also be beneficial in reabsorbing moisture upon cooling.

If desired, fillers or additives such as pigments, stabilizers, softeners, extenders or other polymers can be present in the RF-sensitized bonding film or sheet or the materials to bonded. For example, there can be present substances such as graphite, carbon black, titanium dioxide, glass fibers, carbon fibers, metal powders, magnesium, silica asbestos, mica and the like.

The invention utilizes a RF-sensitized bonding film or sheet (straight polymer or composite) so as to impart to the bonding film or sheet a dielectric loss factor much higher than the materials to be bonded. The RF-sensitized bonding film or sheet having a high dielectric loss factor can be made by conventional methods from the same material as the materials to be bonded. If the materials to be bonded are of a different structure or have a different melting point than the RF-sensitized bonding film or sheet, the RF-sensitized bonding film or sheet can be a laminate of the materials to be bonded and/or sensitized to provide melt temperatures corresponding to the different materials to be bonded.

The RF-sensitized bonding film or sheet will be inserted at an intermediate position adjacent to the materials to be bonded and under pressure exposed to a dielectric field. The RF-sensitized bonding film or sheet will selectively be heated to the desired melt temperatures and will fuse or sinter with the adjoining materials to be bonded which have been heated with heat conduction from the bonding polymer melt. The remaining materials which do not contain the dielectric heat sensitizer will not be significantly heated.

A poly(arylene sulfide) resin and a dielectric heat sensitizer can be formed into a bonding film or sheet using conventional techniques so as to form a RF-sensitized poly(arylene sulfide) bonding film or sheet. The RF-sensitized poly(arylene sulfide) bonding film or sheet is inserted at an intermediate position adjacent to the materials to be bonded and under pressure exposed to the dielectric field for such period of time so as to effect fusion or sintering of the RF-sensitized poly(arylene sulfide) bonding film or sheet to the materials to be bonded. The RF-sensitized poly(arylene sulfide) bonding film or sheet which is inserted at an intermediate position adjacent to the materials to be bonded is exposed to the dielectric field for a period of time generally within the range of about 30 seconds to about 24 hours, preferably about 1 minute to about 2 hours.

The RF-sensitized poly(arylene sulfide) bonding film or sheet and materials to be bonded can be heated by any RF-thermal press capable of effecting fusion of the bonding film and the materials to be bonded. An example of a RF-thermal press is a 5 KW, 20 MHZ regular crossfield RF-press. The RF-fields frequency, strength and type (cross, dispersed or stray field) may be optimized according to the materials, shape and dimensions of elements to be bonded, thickness and loss factor of bonding film.

The RF-sensitized bonding film or sheet can be used to bond any materials so as to form a laminated structure. Examples of such materials to be bonded include thermally stable polymeric material, metal, glass, ceramic or stone. The RF-sensitized poly(arylene sulfide) bonding film or sheet can be particularly useful for bonding poly(arylene sulfide) materials formed by any technique. The presently preferred polymers are poly(phenylene sulfide), poly(biphenylene sulfide), poly(phenylene sulfide sulfone) and poly(phenylene sulfide ketone). Additional materials that can be bonded include metals such as aluminum, iron, titanium, copper, and chromium or metal alloy such as steel, including stainless steel and brass. If desired, fillers or additives can be present in the material to be bonded, for example, such additives include graphite, carbon black, titanium dioxide, glass fibers, metal powders and the like. The materials to be bonded so as to form a laminated structure can be of the same materials or mixtures of various materials. The material to be bonded can be of various thicknesses ranging from about 1/32 of an inch to about 24 inches, preferably from about 1/16 of inch to about 1 inch. The multiple materials to be bonded may comprise a single or multiple layer, film or sheet.

Variation and modification are possible within the scope of the invention as described herein. One skilled in the art in posession of this disclosure having studied the same will understand that various engineering details of operation are necessarily omitted for sake of simplicity.

Example

Using the process of the present invention a 10 mil thick MR-O$_3$ poly(phenylene sulfide) bonding film, RF-sensitized with 2% Frequon ® Z/B-10 (90% crystalline sodium aluminum silicate and 10% electrically conductive carbon black) is placed between 2 glass fiber containing poly(phenyle sulfide) stampable sheets 1/16" of an inch thick. The RF-sensitized bonding film was inserted at an intermediate position adjacent to the stampable poly(phenylene sulfide) sheets, and placed in a 5 KW, 20 MHz regular crossfield RF thermal press for 120 seconds. The RF-sensitized poly(phenylene sulfide) bonding film melted between the 2 stampable poly(phenylene sulfide) sheets so as to form a laminated structure. The results indicated that poly(phenylene sulfide) composite sheets can be bonded with a RF-sensitized poly(phenylene sulifide) bonding film in a RF thermal press so as to form a laminated structure.

I claim:

1. A laminate comprising:
    at least two sheets wherein at least one of the sheets compriss a poly(arylene sulfide) resin;
    a bonding film intermediate the sheets so as to bond the sheets together;
    wherein of the sheets and bonding film only the bonding film is radio frequency sensitized.

2. The laminate according to claim 1 wherein the intermediate radio frequency sensitized bonding film comprises a blend of a poly(arylene sulfide) resin and a dielectric heat sensitizer.

3. The laminate of claim 2 wherein the dielectric heat sensitizer comprises a mixture of crystalline sodium aluminum silicate zeolite and an electrically conductive carbon black.

4. The laminate of claim 3 wherein the dielectric heat sensitizer comprises about 90 parts by weight crystalline sodium aluminum silicate zeolite having a particle size of less than about one micron and a surface area in excess of about 400 m$^2$/g. and 10 parts per weight electrically conductive carbon black in amounts of about 1 to about 5 parts per 100 parts by weight poly(arylene sulfide).

5. The laminate of claim 1 wherein each of the sheets range in thickness from about 1/32 of an inch to about 24 inches.

6. The laminate of claim 1 wherein the poly(arylene sulfide) resin is selected from the group consisting of poly(phenylene sulfide), poly(biphenylene sulfide), poly(phenylene sulfide sulfone) and poly(phenylene sulfide ketone).

7. The laminate of claim 1 wherein the sheets are bonded together by means of the bonding film by exposing the sheets and the bonding film intermediate the sheets to a dielectric field for such a time to effect fusion or sintering of the bonding film to the sheets.

8. The laminate of claim 7 wherein the radio frequency sensitized bonding film is exposed to the dielectric field for a period of time ranging from about 30 seconds to about 24 hours.

9. The laminate of claim 1 wherein the at least one sheet further comprises fibers selected from the group consisting of glass fibers and carbon fibers to thus form a composite.

10. The laminate of claim 9 wherein the bonding film comprises a poly(arylene sulfide) resin and fibers selected from the group consisting of carbon fibers and glass fibers to thus form a composite.

11. A laminate consisting essentially of:
at least one poly(arylene sulfide) sheets;
at least one radio frequency sensitized bonding film intermediate each of the sheets so as to bond the sheets together, wherein only the bonding film is radio frequency sensitized.

12. The laminate of claim 11 wherein the bonding film includes poly(arylene sulfide) resin.

13. The laminate of claim 12 wherein at least one of the sheets further includes fibers selected from the group consisting of carbon fibers and glass fibers to thus form a composite.

* * * * *